United States Patent
Stephens (12)

(10) Patent No.: US 6,879,664 B2
(45) Date of Patent: Apr. 12, 2005

(54) METHOD AND APPARATUS FOR MAPPING THE TERMINATIONS OF LARGE NUMBERS OF COMMUNICATIONS CIRCUITS

(76) Inventor: Charles David Stephens, 2607 Kingsridge Dr., Dallas, TX (US) 75287

( * ) Notice: Subject to any disclaimer, the term of this patent is extended or adjusted under 35 U.S.C. 154(b) by 0 days.

(21) Appl. No.: 10/605,865

(22) Filed: Oct. 31, 2003

(65) Prior Publication Data

US 2004/0136506 A1 Jul. 15, 2004

Related U.S. Application Data

(60) Provisional application No. 60/422,751, filed on Oct. 31, 2002.

(51) Int. Cl.[7] ............................. H04M 1/24; H04M 1/00
(52) U.S. Cl. ............................. 379/26.01; 379/413.04; 379/413.02; 379/25
(58) Field of Search ..................... 379/26.01, 413.04, 379/413.02, 25, 399.01, 32.05, 29.11, 29.05, 27.07, 413.01

(56) References Cited

U.S. PATENT DOCUMENTS 5,528,662 A * 6/1996 Stephens ................. 379/27.06
6,233,558 B1 * 5/2001 Whalley ..................... 704/270

* cited by examiner

*Primary Examiner*—Rexford Barnie

(57) ABSTRACT

An apparatus and method for the efficient mapping of connectivity of telecommunications circuits where large numbers of such circuits are terminated at one end in concentrated bulk terminations. The apparatus regenerates multiple speech signals in a bulk termination adapter identifying both the bulk connector and the individual circuits terminating in the connector. A selectable group identity code allows many such units to be employed simultaneously to effect efficient mapping of hundreds of telecommunications circuits in one step even if concentration points occur in disparate locations. Speech reproduction is accomplished through a serial bit stream where the ratio of one bits to zero bits, varying with time, re-establishes a voice frequency signal with the aid of a simple filter circuit.

9 Claims, 2 Drawing Sheets

//www.w3.org/1999/xhtml">
METHOD AND APPARATUS FOR MAPPING THE TERMINATIONS OF LARGE NUMBERS OF COMMUNICATIONS CIRCUITS

BACKGROUND OF INVENTION

This invention relates to the process of discovering the routing of a plurality of signal wires and more particularly telephone and data wire pairs, in a building environment.

As a result of the rapid changes in telecommunications technology and business climate, the typical wiring closet for telecommunications wiring is poorly documented. As office occupants move and telecommunications equipment is upgraded, any original documentation for telecommunications wiring is usually unreliable. In order to handle the large number of wire pairs typically found in an office environment, bulk termination connectors were created and standardized. These termination connectors provide some order to the telecommunications wiring but do not provide any information regarding the location of the far ends of the terminated wire pairs.

The difficulty in determining the routing of office wiring has resulted in a situation where large changes in the wire routing is not accomplished by simply moving interconnect jumpers but by abandoning existing telecommunications wiring and installing new wiring. This practice has resulted in large amounts of unused telecommunications wiring in buildings thus effecting fire safety. Recent changes in building code requirements now require removal of abandoned telecommunications wiring.

The process of identifying individual telecommunication wire pairs typically involves the application of a unique signal at the individual office terminus then search through the connection points at the bulk termination blocks where individual wire pairs from many offices are terminated. This process has been automated in several ways using a scanning device connected to a plurality of wire pairs at the bulk termination point. This device scans all connected pairs attempting to detect a unique tracing signal from the far end. When found, the device then signals back to the sending device, the location point in the bulk terminal. This process limits the speed in which large numbers of pairs can be mapped because only one craft person may originate a tracing signal at a time. Cost is high due to the need for specialized equipment to originate and scan for the tracing signal then communicate it back to the craft person from the far end.

U.S. Pat. No. 5,528,662 to Stephens, et al. shows a device that uses a switching matrix of relays to route test circuits to one or more wire pairs. The test circuits consist of pulse code modulation voice frequency recording and playback hardware. A feature of this device is to sequence a prerecorded voice vocabulary to each connected wire pair. The voice played back through each pair announces which pair number it is connected to. This allows a craft person using only common telephone equipment at the individual terminal ends to determine the connection point at bulk terminus. Since the device is routing the individual words to each connected pair without intervention, there is no limit on how many craft persons can be mapping the wire pairs simultaneously. The drawback to this device is that it only has one voice circuit and thus can only signal one pair at a time.

U.S. Pat. No. 6,233,558 to Whalley, et al. shows a device that incorporates a plurality of pulse code modulation voice playback circuits such that each connected wire pair does not have a delay caused by the playback of voice to other connected wire pairs. Otherwise, the practice of this device is the same as in Stephens to repeat a unique number by speech on each connected pair thus allowing identification with common telephone equipment.

It is desirable to map all the telecommunications wire pairs in an office in one step without extensive craft intervention to move signal sources even though points of concentration with bulk access may exist in multiple different locations. Without being able to identify every connection, the signal source moves result in lost craft time and repeated testing of unknown terminals in individual offices. Bulk terminations typically occur in several locations in an office environment and may involve a few circuits or hundreds of circuits on multiple bulk connectors in multiple disparate locations. Multiple apparatus with unique identification are necessary to achieve this goal. It is further desirable that temporary connections of mapping devices to bulk connectors be completed in bulk instead of individual wires.

SUMMARY OF INVENTION

The device and process described in this embodiment applies multiple recorded voice signals to an array of wire pairs in a bulk connector by attaching directly to the connector and thus all wire terminals simultaneously. The device further identifies the bulk termination block by one unique identification for the block and another unique identification on each connected wire pair. This allows for many such devices to operate at the same time in multiple locations to effect a complete facility wire mapping in one step. The device uses a ones density encoding for the voice signal such that no power consuming active analog electronics nor extensive data busses are required to recreate the multiple voice signals. Configuration switches are provided to allow each unit to have a unique unit identification to identify the block it is attached to.

DETAILED DESCRIPTION

A device and process to enable workers to identify individuals and their associated groups of telecommunication wire pairs among large number of such wires at multiple locations simultaneously. The process involves placing a unique voice signal on each telecommunication wire pair that both identifies the individual as well as the grouping of the telecommunication wire pair.

The voice signal consists of two phases. The first phase is a unique group identification shared by all member circuits of a group and the second phase is an individual identification unique to each member of a group. The device to generate the voice signals is contained within a bulk connector (FIG. 2—2) such that each circuit path to be identified within the connected cable does not need to be connected individually. This is accomplished through connector clips along one edge of the unit (FIG. 2–1) that make electrical contact directly to the terminals in the connector block. An alternative bulk connection (FIG. 2–3) is provided for "RJ21" terminated cables. The device also has a means of selecting an identity (FIG. 2–4) for each device or group of connected circuits such that a large number of devices can work together, even if from differing locations, to facilitate simultaneous identification of very large numbers of circuits in a facility.

The device uses a voice play back method that employs a high data rate bit stream filtered by analog circuits such that a filtered one to zero density ratio will result in a voice frequency signal. This process reduces the amount of powered analog circuits necessary to reproduce a large number of unique voice signals at the same time. The digital circuit consists of an oscillator clock, a serial non-volatile memory, latches, and clock steering logic. In this implementation, analog filtering of the resulting bit streams consists of a simple resistor-capacitor low-pass filter for wired circuits. The process for fiber optic circuits uses diodes to send each bit stream down each individual fiber where filtering is accomplished at the receiver thus eliminating any need for an analog optical circuit or digital processing at the receive end.

Figure 2:
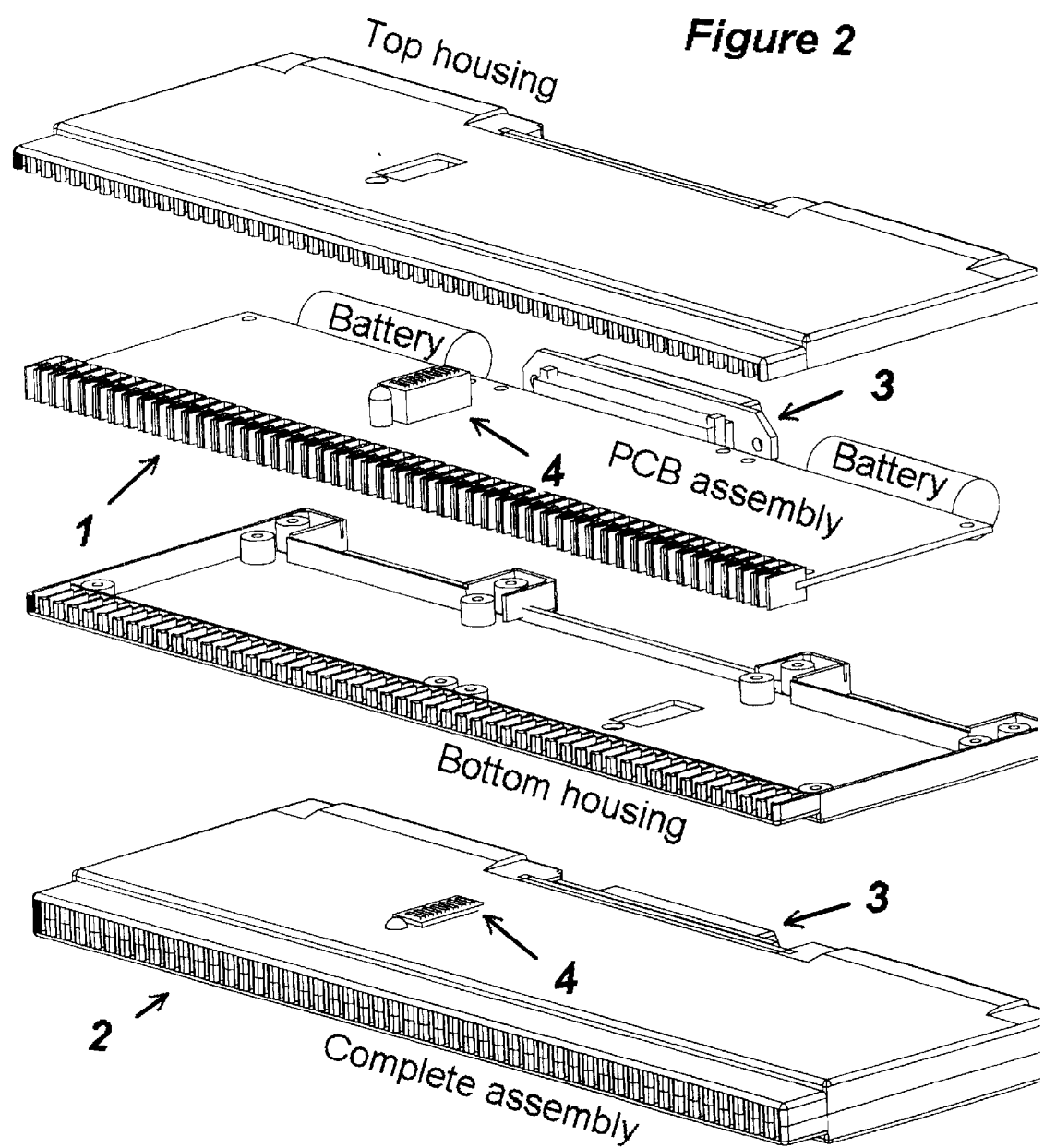
FIG. 2 is shown an exploded perspective of the telecommunications circuit mapping device configured to connect to common "66" type terminal blocks and/or 25 pair "RJ21" telecommunications cables. One edge of the apparatus consists of connector clips designed to temporarily attach directly to the terminals of a terminal block (FIG. 2–1, FIG. 2—2). On another edge is a connector designed to mate with a "RJ21" connector (FIG. 2–3).

The bit streams for each simultaneous voice segment are stored in a serial non-volatile memory in a bit interleaved format. Clock steering logic sends a high frequency clock signal whose frequency is the product of the number of circuits multiplied by each circuit's bit stream data rate. The bit streams are read from the non-volatile memory as a single interleaved bit stream. As the bit corresponding to each circuit's group or individual identity is read, a clock signal for that circuit's latch is activated thus picking out the necessary bit stream for the selected voice segment. The group identity voice segment bit stream for each circuit is determined by group identity code switches (FIG. 2–4). Individual identity speech segments are determined by each circuit's location within the group. Each member of a group will replicate the same bit stream during the group identity phase and unique bit streams during the individual identity phase.

Generation of the bit streams for storage is accomplished by a software translation of conventional PCM recorded voice segments into the necessary one-zero ratio bit stream. For this process, a software mathematical model of the analog filter circuit is calculated with both logic voltages for a digital one and digital zero and the logic output voltage levels using a time interval that is equivalent to the desired output bit stream rate. The two resulting calculated voltage levels are compared to the PCM voltage level at this time interval and the bit state calculation with the least error is selected. This result is then used as the starting voltage for the next interval calculation. Once these bit stream segments are calculated, the segments that might be reproduced simultaneously are bit interleaved into one bit stream for storage. The combined speech segments for group identity are appended to the combined segments for individual telecommunications circuit identities. In the device, the resulting two segments are read serially and the desired individual bit streams are clocked into latches. No specific addresses for the memory are required once a cycle has begun since all interleaved group and individual identities are clocked into output latches if and when they are clocked.

Figure 1:
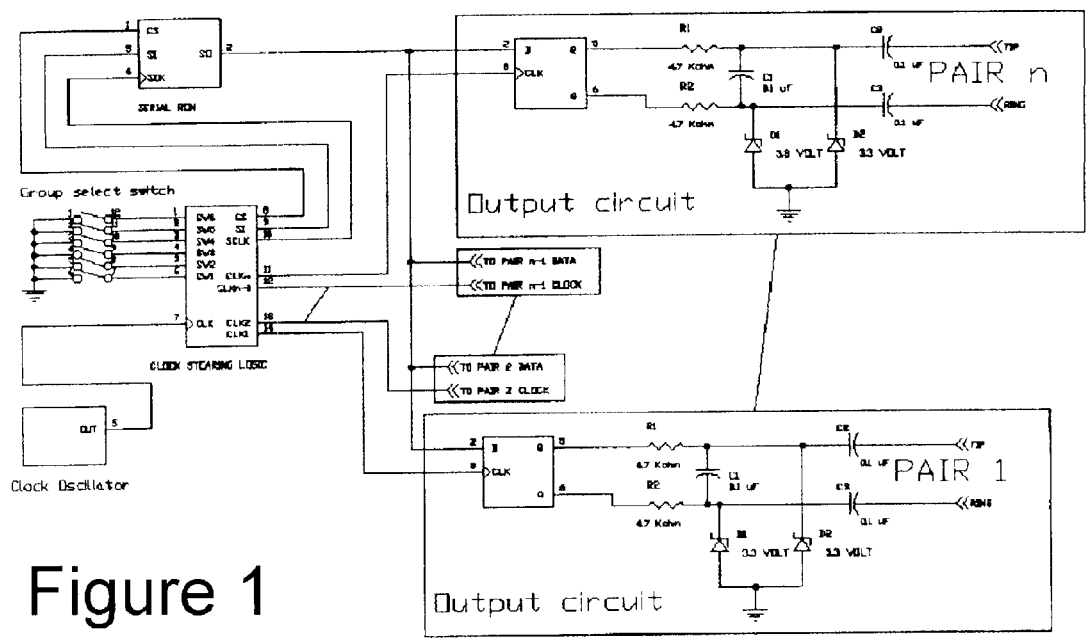
FIG. 1 is a schematic showing the preferred embodiment of the invention. The key elements of the embodiment are show with electrical symbols representing the output circuit. The routing logic is implemented in programmable logic devices although it can be implemented in discrete logic devices understood by those familiar with the art.

FIG. 1 is a schematic of the implementation of the device. Only two of the output circuits are shown although a larger number of identical output circuits exist in the implementation. The number of output circuits is determined by the number of circuits found in the bulk cable connector. A typical application is with 25 pair telephone cable connectors thus such a device would have 25 output circuits. The telephone pair output circuit consists of a data latch with complementary outputs feeding a balanced resistor-capacitor filter. In this implementation, the resistors are shown as R1 and R2 of value 4700 ohms. The capacitor between these resistors, labeled C1, is of value 0.1 micro farad. This forms a low pass, integrating filter for the bit stream. Two zener diodes labeled D1 and D2 provide protection from voltage surges that may come from external sources or from stray charges when the device is connected to the circuits to be mapped. Capacitors C2 and C3 couple the resulting voice signal to the wires and block DC voltages from damaging the device. Data for the output latches comes from the non-volatile serial memory labeled SERIAL ROM. A clock oscillator provides a clock source for the device. Logic circuits, consisting of counters and gates, steer clock pulses to the output latches. The specific pulses for each latch are determined by a count of the interleaved bit sequence and the setting of the group identification code switches (FIG. 2–4).

What is claimed is:

1. A method of simultaneously tracing a plurality of telecommunications circuits from one or more first locations to one or more second locations, comprising the steps of:
   (a) regenerating multiple pre-recorded speech signals;
   (b) selectively applying said speech signals at said first locations to said second location comprising the steps of:
   (i) reading a serial data stream from a speech read only memory, wherein said speech read only memory is formatted and arranged to store and output all vocabulary for the distinct block identification and distinct wire pair identification segments of speech;
   (ii) retrieving one of said block identification speech segments from said speech read only memory;
   (iii) converting said one of said speech segments to an analog output representative of said one of said speech segments;
   (iv) routing said analog output to a telecommunications circuit;
   (v) retrieving one of said pair identification speech segments from said speech read only memory; (vi) converting said one of said speech segments to an analog output representative of said one of said speech segments; and (iv) routing said analog output to a telecommunications circuit;
   wherein each of said telecommunication circuits receives two segments of said speech signal such that one segment is common all others in a group and a second segment that differs from the second segment of said speech signal applied to any other of said telecommunication circuit;
   (c) detecting at said second location, said segments of said speech signal applied to each said telecommunication circuit.

2. The method of claim 1 wherein said synthesized speech signal is converted from a digital signal to an analog signal prior to being applied to said each telecommunications circuit to be mapped.

3. The method of claim 1 wherein said synthesized speech is in the form of a serial stream of individual bits.

4. The method of claim 1, wherein said speech read only memory stores digitized vocabulary in a bit interleaved format.

5. The method of claim 1, wherein step (b) (ii) comprises scanning said speech read only memory sequentially for the common block identification speech segment thereby outputting said speech segment to all channels in said block.

6. The method of claim 1, wherein a selector switch provides a means for the user to select which group identity is preferred.

7. The method of claim 1, wherein step (b)(v) comprises scanning said speech read only memory sequentially for the pair identification thereby outputting said unique speech segments.

8. The apparatus of claim 1 wherein said control means includes a clock source and bit counter.

9. An apparatus for simultaneously tracing a plurality of telecommunications circuits from one or more first locations to a second location comprising:

a means for re-creating distinct segments of speech to be applied to one or more of said plurality of telecommunications circuits to be traced, comprising:

a speech read only memory being formatted and arranged to store and output said segments of speech for each group and output said segments of speech for each individual channel;

a retrieving means for retrieving said speech segment from said memory location of said speech read only memory;

a switching means for selectively connecting and disconnecting said segments of speech to said one or more of said plurality of telecommunications circuits to be mapped; and a control means for controlling the output of said segments of said speech through said switching means; and a bulk connecting means for applying said telecommunications circuits to a bulk telecommunications connector; and a control means for selecting a group identity.

* * * * *